(12) United States Patent
Friess et al.

(10) Patent No.: US 6,331,019 B1
(45) Date of Patent: Dec. 18, 2001

(54) CONDUIT VIBRATION DECOUPLING DEVICE FOR USE IN EXHAUST SYSTEMS

(75) Inventors: Werner Friess, München; Harald Jahnel, Geretsried; Christian Vogt, Icking; Dietmar Morgner, München, all of (DE)

(73) Assignee: Feodor Burgmann Dichtungswerke GmbH & Co., Wolfratshausen (DE)

( * ) Notice: Subject to any disclaimer, the term of this patent is extended or adjusted under 35 U.S.C. 154(b) by 0 days.

(21) Appl. No.: 09/442,737

(22) Filed: Nov. 18, 1999

(30) Foreign Application Priority Data

Dec. 3, 1998 (EP) .................................................. 98122572

(51) Int. Cl.[7] ............................. F16L 55/033; F16L 51/02
(52) U.S. Cl. .............................................. 285/49; 285/300
(58) Field of Search ............................. 285/49, 289, 299, 285/300, 411

(56) References Cited

U.S. PATENT DOCUMENTS

| 2,911,238 | * | 11/1959 | Myers et al. ............................. 285/49 |
| 3,369,829 | | 2/1968 | Hopkins . |
| 4,746,148 | * | 5/1988 | Perkins ................................. 285/114 |
| 5,090,746 | * | 2/1992 | Holzhausen ........................... 285/226 |
| 5,299,827 | | 4/1994 | Igawa . |
| 5,482,330 | * | 1/1996 | Holzhausen ........................... 285/226 |
| 5,542,715 | * | 8/1996 | Mantoan et al. ...................... 285/226 |
| 5,775,737 | * | 7/1998 | Morgner et al. ....................... 285/49 |
| 5,797,628 | * | 8/1998 | Kuhn ..................................... 285/49 |

FOREIGN PATENT DOCUMENTS

| 44 01 827 A1 | 8/1994 | (DE) . |
| 0 432 436 A2 | 6/1991 | (EP) . |
| A 0 615 595 | 4/1994 | (EP) . |
| 0 747 582 B | 12/1996 | (EP) . |
| 0 816 738 A1 | 1/1998 | (EP) . |
| 0 828 064 A | 3/1998 | (EP) . |
| 0 833 091 A | 4/1998 | (EP) . |
| 06 117243 A | 4/1994 | (JP) . |

* cited by examiner

Primary Examiner—Lynne H. Browne
Assistant Examiner—Kenn Thompson

(57) ABSTRACT

A vibration decoupling device for use in exhaust systems of internal combustion engines, comprises a pair of axially spaced conduit connecting members connected with each other by a bellows-type connecting element, and a force transmitting means having at least axial elasticity for transferring forces between said conduit connecting members. The force transmitting means comprises a housing surrounding said bellows-type connecting element, said housing being connected near at least one axial end thereof to an adjacent conduit connecting member by an articulated spring assembly comprising one or more independent spring means. Each spring means comprises at least one leaf spring element and has three force transmitting portions. An intermediate portion of each spring means is connected without clearance to the conduit connecting member and each spring means is connected at one of its two end portions, likewise without clearance, to the housing, whilst the other end portion may be supported by the housing such that there is freeplay in the circumferential direction of the decoupling device. The spring means may overlap one another at their end portions, and together, they form a ring-like space-saving configuration around the corresponding conduit connecting member. The connections are preferably produced without rivets, pins or welding and they present practically no hindrance to the bending of the spring means. Due to the freedom from play, the transfer of torsional forces from the conduit connecting member to the housing can occur without involving the bellows-type connecting element. The housing may be of tubular construction with no projecting parts.

13 Claims, 4 Drawing Sheets

CONDUIT VIBRATION DECOUPLING DEVICE FOR USE IN EXHAUST SYSTEMS

The invention relates to a conduit vibration decoupling device and more particularly to a conduit vibration decoupling device for use in exhaust systems of internal combustion engines.

BACKGROUND OF THE INVENTION

The invention relates, in particular, to a fluid-tight conduit vibration decoupling device having a bellows-type corrugated connecting element which permits changes in axial length and angular displacements. Such a connecting element is, however, sensitive to mechanical stresses especially torsional stresses, so that these stresses need to be by-passed around the connecting element by means of a force transmitting means commonly comprising an articulated spring assembly. Conduit vibration decoupling devices can be subdivided, in dependence on the way in which their articulated spring assemblies are designed, into those where the elasticity is provided by a coil spring extending circumferentially of the centre line of the decoupling device or by a wire cable spring element, and those in which individual spring units are provided. Examples of decoupling devices of the first type are to be found in the following publications: DE-A-44 01 827, EP-A-0 432 436, EP-A-0 615 595, U.S. Pat. No. 3,369,829, EP-B-747 582. The invention is directed to a conduit vibration decoupling device of the second type as is known e.g. from U.S. Pat. No. 5 299 827. In the prior device three annular cable spring units are provided, these being arranged around the periphery of an adjacent conduit connecting member at circumferentially spaced locations and each being rigidly connected to the housing and the conduit connecting member independently of one another. A large amount of space is therefore required between the housing and the conduit connecting member for accommodating these cable spring units so that the known decoupling device has a large radial dimension and this thus runs counter to the trend in the automobile industry towards lightweight, compact decoupling devices. In addition, the sensitive, bellows-type connecting element is not protected or is only protected to a limited extent from torsional stress. Furthermore, a decoupling device of the second type is known from EP-B-0 816 738 which, in contrast to the previously described known device, has the advantage that it can be fabricated and assembled in an effective easy manner whilst, at the same time, being of compact size. In this prior device three linear leaf spring units are disposed around the periphery of an adjacent conduit connecting member, the ends of said units being supported on the housing with a certain amount of circumferential play i.e. in "floating" manner. Further each spring unit engages with clearance the adjacent conduit connecting member and extends therethrough like a secant passing through a circle. The not play-free coupling of the spring units to the housing and the conduit connecting member can lead to the development of irritating noises in use. Furthermore, due to the floating support of the spring units, a relative rotation, even though of limited extent, between the conduit connecting member and the housing cannot be avoided so that the sensitive, bellows-type connecting element will be subjected to a certain amount of torsional stress, which, although lower than was the case for the decoupling device in the aforementioned U.S. Pat. No. 5,299,827, nevertheless may result in a shortening of its useful working life.

An object of the invention is to provide an improved conduit vibration decoupling device. Another object of the invention is to provide a conduit vibration decoupling device having an articulated spring assembly which can easily be manufactured and assembled. Still another object of the invention is to provide a conduit vibration decoupling device in which the bellows-type corrugated connecting element has a greater degree of protection against torsional stress. A further object of the invention is to provide a conduit vibration decoupling device in which the development of noise on the part of the decoupling device can be reduced and a reduction in the dimensions of the decoupling( device realized.

SUMMARY OF THE INVENTION

The conduit vibration decoupling device according to the invention comprises a pair of axially spaced conduit connecting members interconnected with each other by a flexible connecting element, and a force transmitting means having at least axial elasticity for transferring forces between said conduit connecting members whilst by-passing the flexible connecting element. The force transmitting means comprises a housing surrounding said flexible connecting element. The housing is connected near at least one axial end thereof to an adjacent conduit connecting member by an articulated spring assembly having at least a pair of spring means. Each of said spring means comprises at least a single leaf spring element and has end portions spaced from each other. The end portions are supported by said housing. The spring means at an intermediate portion thereof between said end portions is mounted to the conduit connecting member and at one of said end portions to the housing substantially free from clearance or play at least in the circumferential direction of the decoupling device. Consequently, each articulated spring assembly comprises two or more spring) units or spring means distributed around the periphery of the corresponding adjacent conduit connecting member, in which each of said spring means is a component independent of the others and comprising one or preferably more leaf spring elements. In contrast to the above-mentioned known decoupling device having leaf spring elements, the spring means according to the present invention are not "floatingly" supported by the housing or the conduit connecting member with freeplay or clearance, but rather, the spring means do not have any freeplay or clearance with respect to these parts so that the sensitive, flexible, preferably bellows-type connecting element is not involved, not even to a limited degree, in a transfer of torsional forces between the conduit connecting members. The flexible connecting element is thereby protected effectively against torsional loads of any strength. At the same time, the play-free mounting of the spring means to the adjacent conduit connecting member and the housing prevents the occurrence of irritating rattling noises. The play-free mounting can be achieved in several ways by using convenient fabrication techniques. Preferably, the end portions of adjacent spring means overlap each another and thus form a common force transmitting assembly which can be formed without using weakening or time consuming rivet, pin or weld connections. Preferably the play-free mounting is achieved by a clamping interengagement of the parts. A transfer of force from one part to an adjacent one, with the force being distributed over a large surface area, can thereby be achieved, thus avoiding peak loadings which could reduce the useful working life of the assembly. Furthermore a self-aligning property is simultaneously provided for these spring means at the force transmitting portions, thereby making an assembly of the parts less sensitive to the maintenance of tight manufacturing tolerances. If desired, however, a rivet assembly may also be provided. Moreover, the force transmitting portions at the housing end need not be rigid but may be resilient, this being relevant to the transfer of axial forces, so that the freedom from play in the circumferential direction will have only very little or no effect upon the spring behaviour of the spring means. Consequently, in a manner similar to that of the known decoupling devices, the flexibility of the spring means under the effects of axial stress is ensured in like manner to the natural vibration damping property of a plurality of leaf spring elements combined into a spring stack from which each spring means is preferably formed. In accordance with a particularly advantageous embodiment of the invention, the adjacent spring means do not just overlap each another, but each spring means also has a curved configuration in the form of a segment of a circle. The spring means can thus be arranged in the form of a ring extending around the adjacent conduit connecting member in a particularly space saving manner thus minimising the dimensions of the decoupling device.

DETAILED DESCRIPTION OF EMBODIMENTS OF THE INVENTION

Figure 1:
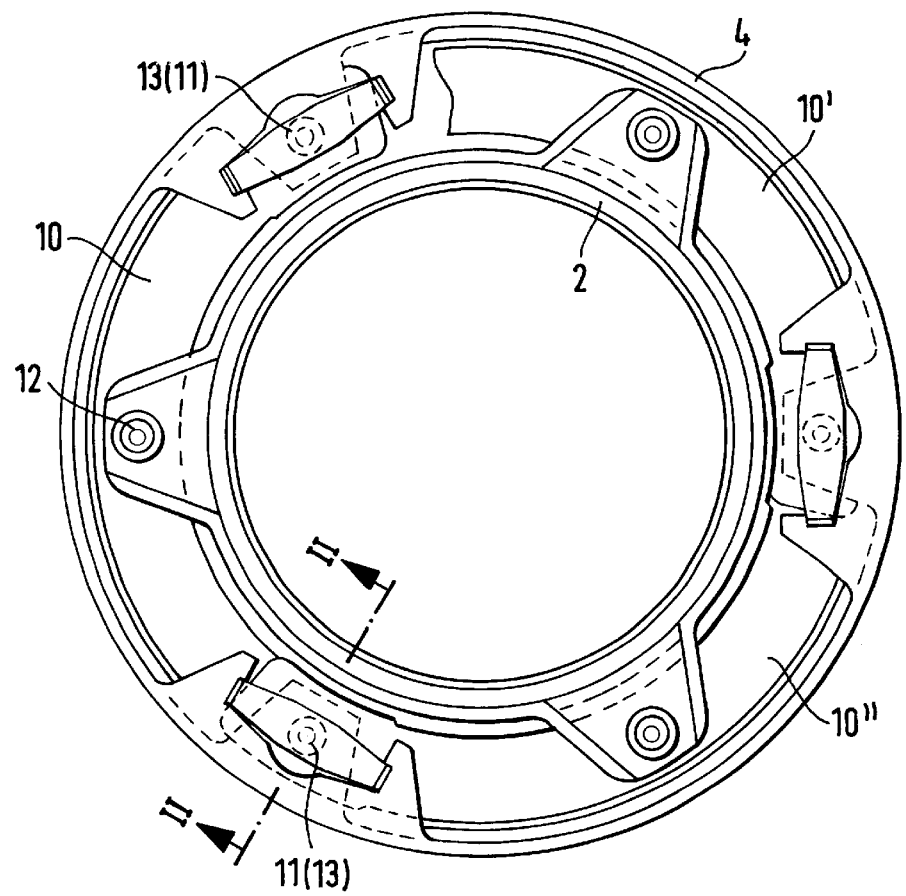
FIG. 1 is a side view of a vibration decoupling device in accordance with a preferred embodiment of the invention.

In the drawing, same or similar components are identified by like reference numbers. Although the invention is described hereinafter in connection with a vibration decoupling device in which articulated spring assemblies lending at least axial flexibility to the vibration decoupling device are provided at each axial end, it should be understood that the provision of such an assembly at one axial end only whilst the other axial end is rigidly connected to an adjacent conduit collecting member is also within the framework of the invention.

In regard to the basic construction of the vibration decoupling device in accordance with the invention, reference will first be made to FIGS. 1 and 2. The vibration decoupling device comprises a flexible connecting element 1 of suitable metal such as steel having a bellows-type corrugated section and, at each axial end thereof, tubular end sections which are each firmly and sealingly connected to a respective conduit connecting member 2, 3 e.g. by welding. The vibration decoupling device can be connected to the ends of an exhaust pipe (not shown) of an internal combustion engine by means of the conduit connecting members 2, 3.

A tubular housing 4 having a preferably rigid structure and extending concentrically with the centre line of the vibration decoupling element surrounds the flexible connecting element I in a radially spaced relationship and may be in the form of a tubular section. The invention is, however, not restricted to such a configuration of the housing 4. If desired, weight-saving openings or recesses may be provided in the housing 4. The housing may have any suitable cross-section configuration while a cylindrical tubular configuration is preferred.

A tubular heat shield element 5 may be secured to the upstream conduit connecting member 2 e.g. by welding. The heat shield element 5 extends co-axially within the flexible connecting element 1, preferably up to the vicinity of the downstream end of the corrugated section of the flexible connecting element 1. The purpose of the heat shield element 5 is to protect the flexible connecting element 1, and especially the corrugated section thereof, from excessive heating by the exhaust gases flowing through the vibration decoupling device.

A damping insert 8 (indicated by dashed lines in FIG. 2) consisting of a suitable vibration damping material such as a layer of metal wires may be provided between the housing 4 and the outer periphery of the flexible connecting element 1, and particularly along the corrugated section thereof. If desired, however, the damping insert 8 and/or the heat shield element 5 may be dispensed with.

The housing 4 is connected in the vicinity of its axial ends to the adjacent conduit connecting members 2, 3 by upstream and downstream articulated spring assemblies 9, 9' having at least axial elasticity. In the embodiment of the invention shown here, each articulated spring assembly 9, 9' comprises three spring means 10, 10', 10". Since the spring means 10, 10', 10" are of identical construction, only one of them, namely the spring means 10 will be described in detail hereinafter.

The spring means 10 comprises at least one leaf spring element although a plurality of leaf spring element is preferred which may be stacked one above the other. The spring means 10 is curved as an arc extending over an angle of somewhat more than 120° so that the end portions of adjacent spring means 10 can overlap each other. The totality of the spring means 10, 10', 10" of the articulated spring assembly 9 may surround the conduit connecting member 2 circumferentially in the manner of a closed ring. However, despite this closed form of ring, each spring means 10, 10', 10" continues to be a basically separate component.

Figure 2:
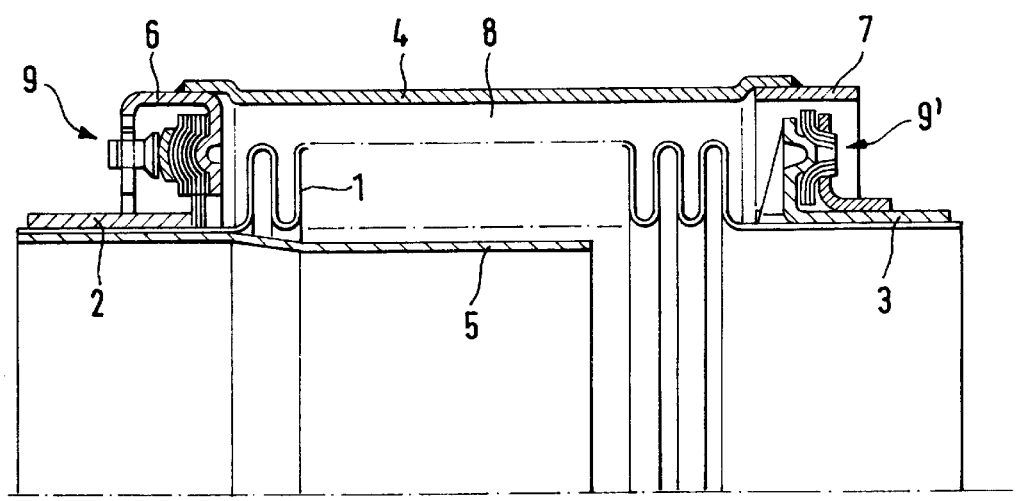
FIG. 2 is a longitudinal sectional view of the vibration decoupling device along the section line II—II in FIG. 1.

As is shown in FIGS. 1 and each spring means 10 has three force transmitting portions 11, 12, 13 by which the spring means 10 is connected to the housing 4 and the conduit connecting member 2, respectively. A pair of force transmitting portions 11, 13 most distantly spaced from each other is related to the housing 4 and an intermediate force transmitting portion 12 is related to the conduit connecting member 2. As a result, each articulated spring assembly 9 comprises three peripherally spaced housing-end force transmitting port ions 11, 13 and three peripherally spaced force transmitting portions 12 related to the conduit connecting member 2, said force transmitting portion 12 being displaced relative to the housing-end force transmitting portions 11, 13.

It should be understood, that the invention is not restricted to the above-mentioned number of spring means 10, but applications are possible in which only two spring means a reprovided, these spring means then being symmetrical relative to the centre line of the vibration decoupling device but not necessarily overlapping each other. More than three spring means 10 may also be provided. Furthermore, the spring means 10 need not necessarily be curved in the form of segments of a circle but may, if desired, extend in a straight line.

One of the housing-end force transmitting portions 11, 13 will be explained in detail hereinafter with reference to FIGS. 4A–4D. The other force transmitting portion is of analogous construction. A feature of each force transmitting portion 11 or 13 is that at least one of the spring means 10 overlapping at this point is supported such as to have no free-play in the peripheral direction of the vibration decoupling device, and that the spring means 10 are resiliently supported, preferably also with no free-play relative to the housing 4, such that an axial flexure of the spring means 10 at the respective force transmitting portion 11 or 13 is not adversely affected, or is only affected to a negligible degree. Consequently, a torsional force exerted to the spring means 10 is transferred to the housing 4 without thereby loading the torsion sensitive 1. connecting element 1.

The transfer of force from the spring means 10 to the housing 4 is effected by a mounting ring 6 attached, e.g. by welding, to the housing 4. Axially spaced support shoulders project radially inward at peripherally spaced points of the mounting ring 6, the overlapping end portions of adjacent spring means 10 being accommodated between said shoulders. It should be understood, that the invention is not restricted to this type of force transfer assembly.

Figure 4A:
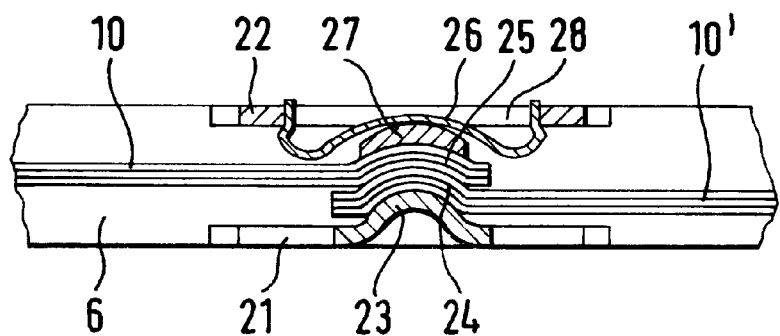

FIG. 4A shows a first preferred embodiment of a force transmitting portion 11 in accordance with the invention. One of the support shoulders 21, 22 comprises a domed elevated portion 23 which extends towards the other support shoulder 22 and may have a configuration corresponding virtually to that of a segment of a sphere. A domed elevated portion 24 matching the superficial configuration of the domed portion 23 is formed on one of the overlapping end portions of the adjacent spring means 10, 10', said domed portion 24 engaging the domed portion 23 on the support shoulder 22 in the manner of a ball and socket joint. The relevant spring means 10' is thereby positioned such that there is no free-play relative to the support shoulder 21 at this location. A further cup- shaped elevated portion 25 is provided on the adjacent overlapping end portion of the other spring means 10, said domed portion 25 again being matched to the outer superficial configuration of the domed portion 24 of the one spring means 10' and thereby enveloping it in the manner of a ball socket. At this location, the spring means 10, 10' are thereby positioned such that there is no free-play therebetween, although, due to the greater effective radii of the domed portions 24, 25 on the springs, this positioning is less marked than that between the one springy means 10' and the domed portion 23 on the support shoulder 21. The domed portions 23, 24, 25 may be fabricated in a convenient manner by a suitable shaping technique e.g. by stamping.

A spring biasing means comprising one or more spring clips 27 supported in an opening 28 of the support shoulder 22 is provided in order to hold together and resiliently bias the assembly of superimposed domed portioned 24, 25 of the spring means 10, 10' relative to each other and relative to the domed portion 23 of the support shoulder 21. A bearing plate 26 is preferably provided between the spring clip 27 and the adjacent domed portiont 25 in order to transfer the bias force exerted by the spring clip 27 in uniform manner to the domed portion 25.

A freedom from play in the axial direction of the vibration decoupling device within the limits defined by the magnitude of the spring biasing force is created in the embodiment of the housing-end force transmitting portion described above as a result of the fact that the spring means 10, 10' can only escape from their mutual locational relationship if the axially effective stresses overcome the spring biasing force. In normal operation of the vibration decoupling device, the spring means 10, 10' are positioned such as to have no free-play between themselves as well as in relation to the supporting shoulder 21. In practice, the ball and socket type joint coupling the spring means 10, 10' does not prevent them from flexing in the axial direction. A torsional force exerted on the spring means 10, 10' will be transferred by the supporting shoulder 21 to the housing 4 without the connecting element 1 being exposed to an, at least initial, torsional stress, as in the known vibration decoupling device.

Figure 3:
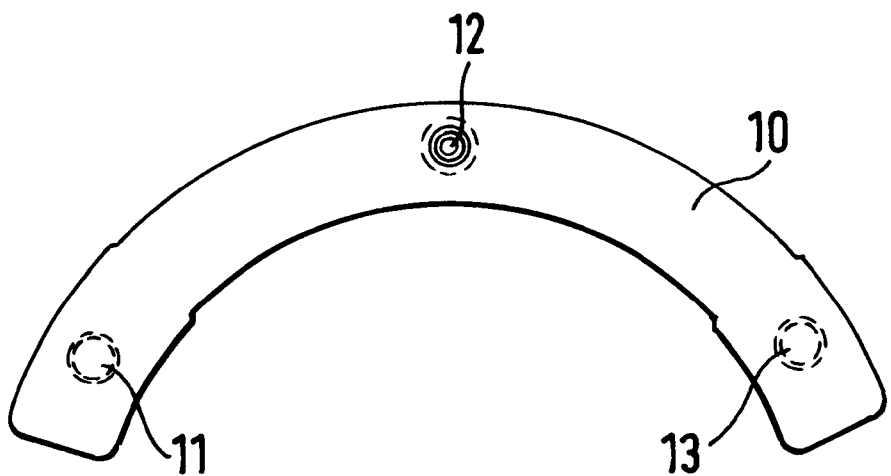
FIG. 3 is a detailed view of a spring means of the vibration decoupling device shown in FIG. 1.
Figure 3A:
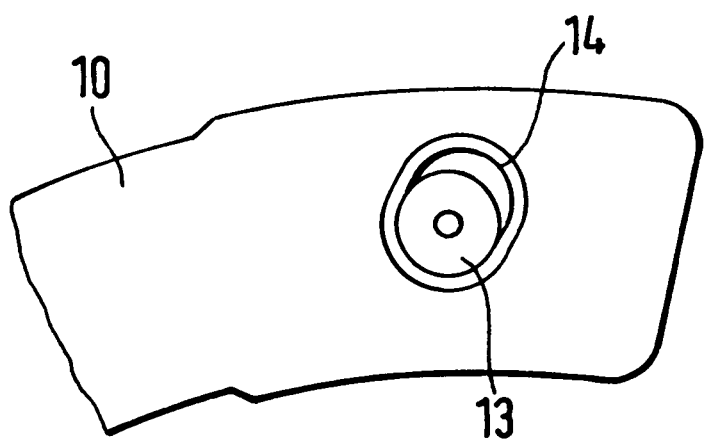
FIG. 3A is an enlarged fragmentary view of a modification of the spring means shown in FIG. 3 when being used in conjunction with some of the embodiments of the housing-end force transmitting portions shown in FIGS. 4A–4D, FIGS. 4A–4E are a fragmentary, partly sectional views of different embodiments of the housing-end force transmitting portions.
Figure 4B:
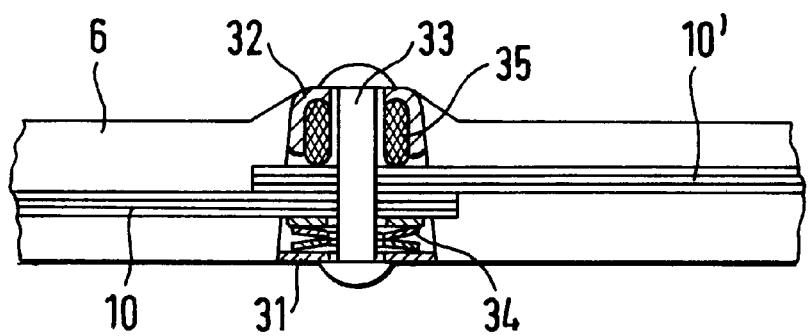

FIG. 4B shows an embodiment of the housing-end force transmitting portion 11 or 13 in which the overlapping end portions of adjacent spring means 10, 10' have mutually aligned holes into which a pin or stud 31 is inserted. The pin 33 is a tight fit in the hole in one of the spring means 10, 10' i.e. there is essentially no freeplay, whilst the hole in the other spring means is somewhat larger as shown in FIG. 3A at 14. Consequently, within the limits set by the dimension of the larger hole, the end portion of this spring means can move circumferentially relative to the pin 33 and hence relative to the other spring means. The pin 33 passes through further holes in the supporting shoulders 31, 31 of the mounting ring 6 and may be firmly connected thereto e.g. by riveting.

A biasing means in the form of a wire mat 35 accommodated by one of the supporting shoulders 31, 32 on one side of the superimposed end portions of the spring means 10, 10' and a cup spring 34 on the other side apply an axial bias force to the end portions of the spring means 10, 10', firstly, in order to mount the spring means 10, 10' on the supporting shoulders 31, 32 and secondly, to permit relative circumferential movement of one of the spring means 10, 10' relative to the other against the frictional force produced by the bias force without the axial flexure of the spring means 10, 10' thereby being impeded to any great extent as a result of the play-free mounting assembly.

Figure 4C:
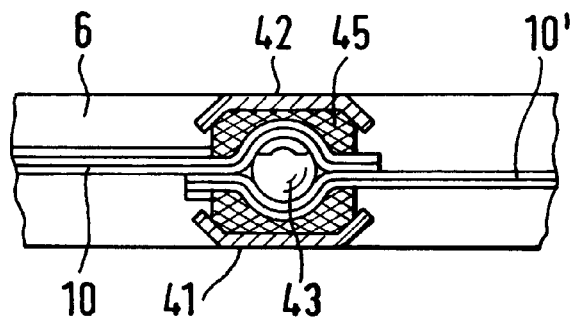

FIG. 4C shows another embodiment of a housing-end force transmitting portion 11 or 13 in which the overlapping end portions of the adjacent spring means 10, 10' fit snugly round a ball-shaped coupling element 43. A wire mat 45 is clamped between the supporting shoulders 41, 42 of the mounting ring 6. Within the limits set by the bias force exerted by the wire mat 45 on the overlapping end portions of adjacent spring means 10, 10' and the coupling element 43 held therebetween, this embodiment of the invention produces freedom from play in both the axial and the circumferential directions of the decoupling device without adversely affecting the axial flexure of the spring means 10, 10'.

Figure 4D:
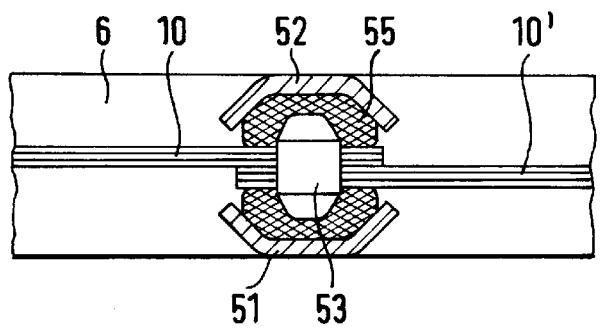

FIG. 4D shows a further embodiment, of similar construction to the embodiment of FIG. 4B, of a housing-end force transmitting portion 11 or 13 in which a pin 53 is inserted into mutually aligned holes in the overlapping end portions of adjacent spring means 10, 10'. The pin 53 is a flush fit in one of the holes i.e. there is essentially no freeplay, whilst the other hole is somewhat larger c.f. FIG. 3A so that the spring means 10, 10' can move circumferentially relative to one another. A wire mat 55 is clamped between the supporting shoulders 51, 52 projecting out radially from the mounting ring 6 for exerting a bias force on the overlapping end portions of the spring means 10, 10' and simultaneously positioning the location of the pin 53. The effects achieved with this embodiment are similar to those of the embodiment of FIG. 4B to which reference is hereby made.

In the case of the embodiments of housing-end force transmitting portions 11, 13 shown in FIGS. 4A, 4B and 4D, it should be understood that the positioning of the spring means relative to the supporting shoulders in the force transmitting portion 11 is in a reverse axial sequence to that in the other force transmitting portion 13, i.e. each spring means is circumferentially fixed at one force transmitting portion but is relatively moveable at the other force transmitting portion.

Figure 4E:
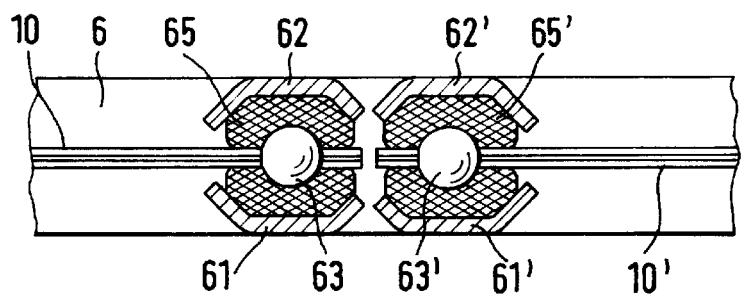

Finally, FIG. 4E shows an embodiment of a housing-end force transmitting portion 11 or 13 which differs from the preceding embodiments of FIGS. 4A–4D in that the end portions of the adjacent spring means 10, 10' do not overlap but are spaced apart from one another. A respective ball element 63, 63' embedded in a surrounding wire mat 65, 65' is positioned in a hole in the end portion of each spring means 10 and 10'. The wire mat 65, 65' is clamped between the supporting shoulders 61, 62 or 61', 62' projecting out from the mounting ring 6. Consequently, within the limits defined by the bias force of the wire mat 65, 65', each spring means 10 and 10' is resiliently fixed with no freeplay in the circumferential and axial directions but can flex practically unhindered in the axial direction.

Figure 5:
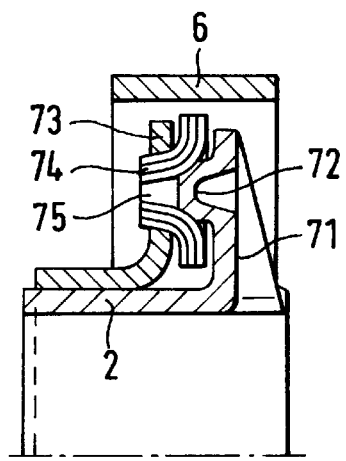
FIG. 5 is a fragmentary, part sectional view of a preferred embodiment of a force transmitting portion at the conduit connecting member end.

Reference will be made hereinafter to FIG. 5 which shows a preferred embodiment of the force transmitting portion 12 at the intermediate position of each spring means 10. The transfer of force between the spring means 10 and the adjacent conduit connecting member 2 has no freeplay and is also preferably free from spring elasticities so that stresses effective on the conduit connecting member 2, especially torsional stresses, are transferred to the spring means 10 practically "rigidly".

The force transmitting portion 12 comprises a radial flange-like bent member 71 of the conduit connecting member 2 having an elevation or dent 72 therein produced by a suitable shaping process e.g. stamping. The dent 72 engages in a chalice-like punched boring 75 which is formed in the spring means 10 in alignment with the dent 72 and is bounded on the side of the spring means 10 remote from the dent 72 by an axially projecting wall bead 74. The wall bead 74 itself engages in a boring in a radially extending supporting profile 73 attached to the conduit connecting member 2 e.g. by welding. After the parts have been positioned, the spring means 10 is fixed firmly with no freeplay, but preferably not rotationally fixed, between the bent member 71 and the supporting profile 73 so that torsional and axial forces effective on the conduit connecting member 2 are transferred to the spring means 10 with no freeplay. As an alternative to the embodiment of the force transmitting portion 12 described above, the assembly consisting of the flange-like bent member 71, the spring means 10 and the supporting profile 73 could be firmly connected together by a rivet passing therethrough or this connection could simply rely on a compression moulding process. As previously mentioned, the connection should be free of play but not rigid so that an angular displacement of the spring means 10 relative to the conduit connecting member 2 is possible. Connections without rivets are preferred because of the improved fabrication possibilities and the greater reliability in use.

Although the invention has been described hereinabove on the basis of preferred embodiments, it should be understood that it is not restricted thereto. Other ways of constructing the force transmitting portions by which each spring means is connected to the housing and the conduit connecting member may be envisaged by a skilled person on the basis of the teaching provided hereinabove, provided that they produce a substantially play-free transfer of at least the torsional stresses from the conduit connecting member to the housing whilst relieving the load on the bellows-type flexible connecting element. A further requirement for the force transmitting portions is that the spring behaviour of each spring means and hence of the articulated spring assembly as a whole should be properly predeterminable so that the flexure of the spring means in the axial direction of the decoupling device will only be slightly adversely affected or will not be affected at all. Each articulated spring assembly is preferably covered circumferentially by the housing or by the mounting ring attached thereto so as to protect it to the greatest possible extent from damage. If desired, the housing or the mounting ring could be angled radially inwards towards the corresponding conduit connecting member so that the articulated spring assembly would then be substantially screened. Effective protection against excessive axial deflection of the spring means would be obtained at the same time thereby.

What is claimed is:

1. A conduit vibration decoupling device for use in exhaust systems of internal combustion engines, comprising a pair of axially spaced conduit connecting members interconnected with each other by a flexible connecting element, and a force transmitting means having at least axial elasticity for transferring forces between said conduit connecting members whilst by-passing the flexible connecting element, said force transmitting means comprising a housing surrounding said flexible connecting element, said housing being connected near at least one axial end thereof to an adjacent conduit connecting member by an articulated spring assembly having at least a pair of spring means, each of said spring means comprising at least a single leaf spring element and having a pair of end portions spaced from each other, and wherein each of said spring means at an intermediate portion thereof between said end portions being mounted to the adjacent conduit connecting member substantially free from play at least in the circumferential direction of the decoupling device, and wherein the end portions of said spring means being supported by said housing at circumferentially spaced locations thereof in which one of said end portions being supported by said housing substantially free from play at least in the circumferential direction of the decoupling device.

2. The conduit vibration decoupling device according to claim 1, wherein said spring means at the other end portion thereof is supported by the housing with play in the plane of the spring means.

3. The conduit vibration decoupling device according to claim 1, wherein said spring means in the longutidinal direction thereof extends in the form of a segment of a circle.

4. The conduit vibration decoupling device according to claim 3, wherein the end portions of adjacent spring means overlap each other.

5. The conduit vibration decoupling device according to claim 1, wherein a bias force effective substantially in the axial direction of the decoupling device is exerted to said spring means on at least one of said end portions there.

6. The conduit vibration decoupling device according to claim 4, wherein each of said end portions has formed therein at least a single domed portion, and wherein the domed portions of the overlapping end portions of adjacent spring means are aligned with each other and with a domed portion formed of said housing, said domed portions of the overlapping end portions and the housing are pressed into interengagement with each other by said bias force.

7. The conduit vibration decoupling device according to claim 6, wherein a clip means is provided between the housing and said overlapping end portions for applying said bias force thereto.

8. The conduit vibration decoupling device according to claim 3, wherein a ball element is provided between the overlapping end portions of adjacent spring means.

9. The conduit vibration decoupling device according to claim 3, wherein the overlapping end portions of adjacent spring means each comprises a hole whereby adjacent holes are aligned with each other and include a positioning pin inserted therein.

10. The conduit vibration decoupling device according to claim 1, wherein each spring means is supported by the housing independently of an adjacent spring means.

11. The conduit vibration decoupling device according to claim 1, wherein said spring means is connected to the adjacent conduit connecting member free of play and spring elasticity.

12. The conduit vibration decoupling device according to claim 11, wherein said spring means is press-fitted between a pair of opposite flange portions extending from the conduit connecting member.

13. The conduit vibration decoupling device according to claim 1, wherein a plurality of spring means is aligned in a circumferential direction for surrounding the adjacent conduit connecting member in the manner of a closed ring.

* * * * *